Figure 1:
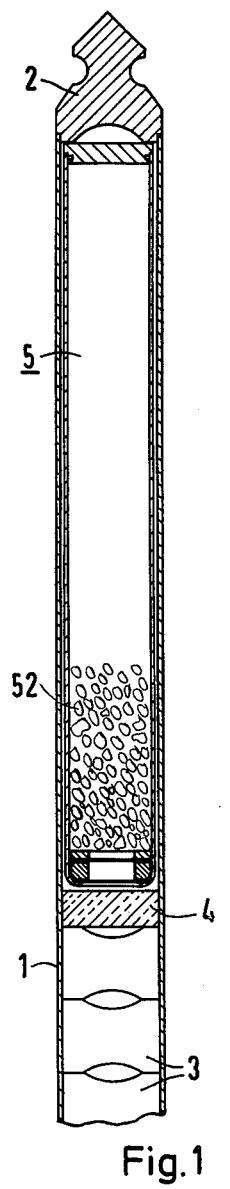

United States Patent [19]

Steven

[11] 4,121,972
[45] Oct. 24, 1978

[54] NUCLEAR REACTOR FUEL ROD
[75] Inventor: Josef Steven, Erlangen, Germany
[73] Assignee: Kraftwerk Union Aktiengesellschaft, Mülheim (Ruhr), Germany
[21] Appl. No.: 725,197
[22] Filed: Sep. 21, 1976
[30] Foreign Application Priority Data
Sep. 29, 1975 [DE] Fed. Rep. of Germany ....... 2543462
[51] Int. Cl.² .............................................. G21C 3/02
[52] U.S. Cl. ........................................ 176/68; 176/78
[58] Field of Search ............................. 176/68, 76, 78
[56] References Cited
U.S. PATENT DOCUMENTS

| 3,131,129 | 4/1964 | Morrison ................................. 176/68 |
| 3,180,804 | 4/1965 | Flora et al. ............................. 176/68 |
| 3,291,700 | 12/1966 | Brossa et al. ....................... 176/68 X |
| 3,406,094 | 10/1968 | Beisswenger et al. ............ 176/68 X |
| 3,519,537 | 7/1970 | Ferrari ................................. 176/68 |
| 3,647,623 | 3/1972 | Hepps et al. ........................... 176/68 |
| 3,697,377 | 10/1972 | Gauthron ........................... 176/68 X |
| 4,010,069 | 3/1977 | Jung et al. .............................. 176/68 |

Primary Examiner—Peter A. Nelson
Attorney, Agent, or Firm—Herbert L. Lerner

[57] ABSTRACT

A nuclear reactor fuel rod formed of a cladding tube, end caps hermetically sealing the tube at both ends thereof, the tube being divided transversely into two longitudinal zones one of which is for receiving a charge of nuclear fuel and the other of which is for receiving gas-adsorbing material free of nuclear fuel, includes means received in the second zone for simultaneously supporting the tube and for containing gas-adsorbing material therein, the means having a capsule having an open end facing toward the one zone and a gas-permeable member closing off the open end of the capsule, the capsule containing adsorber material that has been dried and degassed in high vacuum at temperatures of from 500° to 1000° C, the capsule having an interior space between the adsorber material contained therein and the gas-permeable element, and including a metallic foil destructible by a given internal pressure of the fuel rod gas-tightly closing the interior space; and method of production.

5 Claims, 2 Drawing Figures

NUCLEAR REACTOR FUEL ROD

The invention of the instant application relates to a nuclear reactor fuel rod formed of a cladding tube hermetically sealed by end caps at both ends thereof, and adapted to contain a charge of nuclear fuel, preferably in pellet form, and having at one end thereof a zone which is free of nuclear fuel and filled with gas-adsorbing material, as well as a method of production thereof. Such fuel rods have become known heretofore, for example, from the German Published Nonprosecuted Application DT-OS No. 1,903,989. It is the purpose of these gas-adsorbing materials, such as activated carbon and activated aluminum oxide, for example, on the one hand, to eliminate additional devices for venting the fission gases and, on the other hand, to limit the internal pressure in the fuel rods to a permissible maximum value, so that no additional reinforcement of the cladding tube walls becomes necessary. In this connection, it should be mentioned that such fuel rods are preferably made with a so-called "initial internal pressure" i.e. they are provided beforehand with an internal pressure of about 30 bar during manufacture thereof. Due to the operating temperature, this internal pressure is increased to the extent that the cladding tube has to withstand only a relatively small differential pressure between the external and the internal pressure. The fission gases produced during burnup of the nuclear fuel increase this internal pressure of the fuel rods, so that the increased internal pressure could cause cracking of the cladding tubes under certain conditions, unless special measures are taken. The development of such an excess pressure is prevented by adsorber materials.

Since the adsorption capacity of any material decreases with increasing temperature, provision must be made for inserting these materials into the nuclear reactor fuel rod in a state of maximum adsorptivity. It has been known heretofore to produce this condition by driving out previously adsorbed gases by means of heat. However, any handling of the thus degassed adsorber materials in a gas atmosphere is again linked with an adsorption of gas molecules, so that the adsorptivity suffers anew. Degassing of the carbon is, furthermore, important so that the carbon is inserted into the fuel rod in dry condition in order to avoid damage to cladding tubes caused by moisture.

It is accordingly an object of the invention to provide a fuel rod construction such that adsorbing material can be placed in the fuel rod in completely degassed condition, as well as a method of producing such a fuel rod construction. With the foregoing and other objects in view, there is provided, in accordance with the invention, a nuclear reactor fuel rod formed of a cladding tube, end caps hermetically sealing the tube at both ends thereof, the tube being divided transversely into two longitudinal zones one of which is for receiving a charge of nuclear fuel and the other of which is for receiving gas-adsorbing material free of nuclear fuel, and means received in the second zone for simultaneously supporting the tube and for containing gas-adsorbing material therein, the means comprising a capsule having an open end facing toward the one zone and a gas-permeable member closing off the open end of the capsule.

In accordance with another feature of the invention, the capsule contains adsorber material that has been dried and degassed in high-vacuum at temperatures of from 500° to 1000° C., the capsule having an interior space between the adsorber material contained therein and the gas-permeable element, and including a metallic foil destructible by a given internal pressure of the fuel rod gas-tightly closing the interior space.

In accordance with a further feature of the invention, the adsorber material is activated carbon in granulated form.

In accordance with an alternative feature of the invention, the adsorber material is activated carbon in pellet form.

In accordance with an added feature of the invention, the gaspermeable element is a wire screen.

In accordance with an alternate feature of the invention, the gas-permeable element is a porous sinter-material tablet.

Because the adsorber material is stored in the capsule under high vacuum, it can be stored indefinitely, therefore. The foil, due to the small diameter thereof which is in the order of magnitude of 8 to 10 mm, is thoroughly capable of withstanding the pressure differential caused thereby relative to the normal atmosphere. Only the initial internal pressure applied after assembly of the fuel rod, or the developing operating pressure destroys this foil, so that then, the adsorber material with maximum adsorptivity is in communication with the interior of the fuel rod and the fuel charge thereof.

In accordance with the invention, there is provided in a method of producing the nuclear reactor fuel rod, the steps of placing a gas-permeable element within and across an open bottom end of a capsule, successively inserting into the capsule a spacer ring against the gas-permeable element, a gas-tightly sealing foil against the spacer ring, the foil being destructible by a given internal pressure of the fuel rod, a support ring against the foil, and a ring of solder against the support ring, pouring gas-adsorbing material into the capsule above the support ring, and placing a lid formed with a peripheral groove filled with solder across an open top end of the capsule.

In accordance with another mode of the method of the invention, the assembled capsule is heated in a high-vacuum furnace to a temperature at which the solder melts and the adsorber material is degassed, the gas from the adsorber material being driven out of the capsule through the molten solder.

In accordance with a further mode of the method of the invention, the heated capsule is cooled to solidify the solder to form a gas-tight seal between the capsule wall, the spacer ring, the foil and the support ring.

In accordance with an added mode of the invention, during operation of the nuclear reactor, the gas-tightly sealing foil is destroyed at the given internal pressure of the fuel rod.

Other features which are considered as characteristic for the invention are set forth in the appended claims.

Although the invention is illustrated and described herein as embodied in Nuclear reactor fuel rod, it is nevertheless not intended to be limited to the details shown, since various modifications and structural changes may be made therein without departing from the spirit of the invention and within the scope and range of equivalents of the claims.

Figure 2:
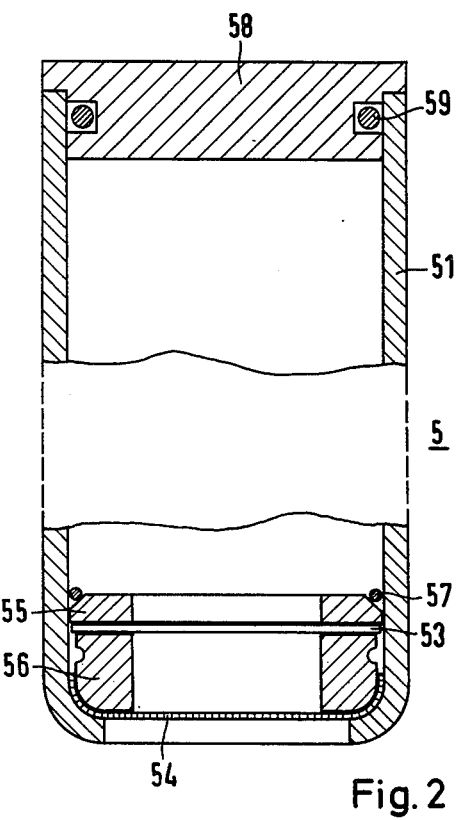

The construction and method of operation of the invention, however, together with additional objects and advantages thereof will be best understood from the following description of specific embodiments when read in connection with the accompanying drawings, in which:

FIG. 1 is a longitudinal sectional view of the upper part of a fuel rod constructed in accordance with the invention; and FIG. 2 is an enlarged fragmentary view of FIG. 1 showing in longitudinal section, partly broken away, a capsule containing adsorber material.

Referring now to the drawing and first particularly to FIG. 1 thereof, there is shown a fuel rod according to the invention formed of a cladding tube or can 1, end caps 2, a nuclear fuel pellet charge 3 as well as a capsule 5 containing activated carbon 52. Between this capsule 5 and the nuclear fuel charge 3, an heat-insulating ceramic pellet or tablet 4 is additionally disposed. The adsorbing material, in this case, activated carbon 52, is located inside the capsule 5 in granulated form. However, this adsorbing material could also be provided in pellet or tablet form. The capsule 5 virtually fills out the entire fission-gas plenum or collecting chamber of the fuel rod and also replaces the support sleeve otherwise usually contained therein and having as its purpose the prevention of buckling of the cladding tube in this zone due to external pressure from the reactor coolant. In the case at hand, this support sleeve can be omitted; the purpose thereof being also fulfilled by the capsule 5.

As mentioned hereinbefore, it is important that the adsorber material be sealed into the capsules 5 in a state of maximum gas adsorptivity. FIG. 2 shows one possibility of sealing the capsule, by which this objective is obtained in a relatively simple manner. The capsule 5, according to FIG. 2 is formed of a cylindrical outer tube or sleeve 51, which is closed off at one end by a lid 58 and at the other end thereof by a foil 53 formed, for example, of steel and having a thickness of about 50 μm (0.05 mm), the foil 53 being engaged by a pressed-in support ring 55. The sleeve 51 is closed off from the outside by a screen 54, which is held by a spacer ring 56 between a drawn-in rim of the sleeve 51 and the foil 53.

In the assembly of this capsule 5, the wire screen 54, the spacer ring 56, the foil 53 and the support ring 55 are sequentially inserted into the sleeve 51 and pushed against the lower drawn-in rim thereof. Then, a ring of solder material 57, such as copper of silver solder, for example, is introduced. Thereafter adsorption material, such as activated carbon, for example, is poured in. Finally, the lid 58 is set in place, the lid 58 similarly having a solder wire ring 59 received in a circular groove formed in the lid 58. The capsule 5 is then placed, in this condition, in a high-vacuum furnace and heated therein under high vacuum up to the melting temperature of the solder. In this manner, the adsorber-material charge contained in the capsule 5 is degassed, and the liberated gas is yet able to escape through the spaces between the sleeve 51 and the support ring 55. These spaces can be enlarged additionally by suitably embossing the outer surface of the support ring 55. After the melting temperature of the solder rings 57 and 59 is obtained, the molten solder fills the gaps between the lid 58 and the sleeve 51 as well as between the support ring 55, the foil 53 and the sleeve 51. The spacer 56 has the purpose of ensuring a good contact surface of the foil 53 at the support ring 55, and also of preventing further flow of the molten solder material towards the screen 54. The screen 54 has the purpose, first, of ensuring unimpeded passage of the gas, and also of preventing the adsorber material from falling out of the capsule 5. Care must therefore be taken that the screen mesh is not filled with solder material. Instead of a wire screen, another highly porous material, such as sintered metal balls or ceramic particles, for example, can also be used, of course.

To complete the manufacture of the adsorber capsules 5, drying of the activated carbon 52 and sealing the capsule 5 with the solder 57 and 59 are effected in one operation within a high-temperature vacuum furnace. For the purpose of assuring trouble-free flowing of the solder material, the capsules 5 are stacked in the furnace vertically, with the respective covers 58 thereof at the top.

Other constructions for such capsules containing adsorber material, are also possible, of course. Common to all of them, however, is the preparation of the adsorber material independently of the assembly of the fuel rods as well as subsequent handling thereof without requiring special precautions. In order to provide some idea of the size of such capsules, it might be mentioned in conclusion that they, as hereinaforementioned, fill the fission-gas plenum or collecting chamber of the nuclear fuel rods i.e. have a length of from 30 to 50 cm and an outisde diameter in the order of magnitude of 1 cm. The adsorber material charge, in the case of acitvated carbon, may be, for example, from 8 to 30 Grams. Stainless steel is preferred as the material for the sleeve 51. In the case of such a material, it is advisable, as aforementioned, to use copper for the soldering, because trouble-free flow of copper as soldering material is assured at temperatures above 700° to 800° C. Lower degassing temperatures, for example, in the order of magnitude of 500° C., would be possible, but they then require additional flux for the soldering process, the vapors thereof being exhausted by means of a vacuum pump and consequently resulting in technical difficulties under certain conditions.

There are claimed:

1. A nuclear reactor fuel rod formed of a cladding tube, end caps hermetically sealing the tube at both ends thereof, the tube being divided transversely so as to form two longitudinally-extending zones located one behind the other for receiving therein, respectively, a charge of nuclear fuel and a charge of gas-adsorbing material free of nuclear fuel, comprising means disposed in the zone wherein a charge of gas-adsorbing material is receivable for simultaneously supporting the tube and for receiving gas-adsorbing material therein, said means comprising a capsule having an open end facing toward the zone wherein a charge of nuclear fuel is receivable, a gas-permeable member closing off said open end of said capsule, a charge of gas-adsorbing material that has been dried and degassed in high vacuum at temperatures of from 500° to 1000° C. being received in said capsule, said capsule having an interior space between the gas-adsorbing material received therein and said gas-permeable member, and a metallic foil destructible by a given internal pressure of the fuel rod gas-tightly closing said interior space from the adsorber material received in said capsule.

2. Nuclear reactor fuel rod according to claim 1 wherein said gas-permeable member is a porous sinter-material tablet.

3. Nuclear reactor fuel rod according to claim 1 wherein said gas-adsorbing material is activated carbon in granulated form.

4. Nuclear reactor fuel rod according to claim 1 wherein said adsorber material is activated carbon in pellet form.

5. Nuclear reactor fuel rod according to claim 1 wherein said gas-permeable member is a wire screen.

* * * * *